(12) United States Patent
Littmann et al.

(10) Patent No.: US 9,726,150 B2
(45) Date of Patent: Aug. 8, 2017

(54) UNITS AND METHODS FOR ENERGY STORAGE

(75) Inventors: Wolfgang Littmann, Wunstorf (DE); Norbert Boehm, Bamberg (DE)

(73) Assignee: Erneo Energiespeichersysteme GmbH, Wunstrof (DE)

( * ) Notice: Subject to any disclaimer, the term of this patent is extended or adjusted under 35 U.S.C. 154(b) by 152 days.

(21) Appl. No.: 14/355,994

(22) PCT Filed: Jul. 18, 2012

(86) PCT No.: PCT/EP2012/064083
§ 371 (c)(1),
(2), (4) Date: Jul. 9, 2014

(87) PCT Pub. No.: WO2013/064276
PCT Pub. Date: May 10, 2013

(65) Prior Publication Data
US 2015/0091301 A1 Apr. 2, 2015

(30) Foreign Application Priority Data

Nov. 5, 2011 (DE) .................. 10 2011 117 785
Dec. 21, 2011 (DE) .................. 10 2011 121 738
(Continued)

(51) Int. Cl.
*F02C 6/16* (2006.01)
*F03B 13/06* (2006.01)
(Continued)

(52) U.S. Cl.
CPC .................. *F03D 9/17* (2016.05); *F02C 6/16* (2013.01); *F03B 13/06* (2013.01); *H02K 7/1823* (2013.01);
(Continued)

(58) Field of Classification Search
CPC . Y02E 60/15; Y02E 60/17; F02C 6/16; F03B 13/06; F03D 9/17
(Continued)

(56) References Cited

U.S. PATENT DOCUMENTS 2,433,896 A * 1/1948 Gay .................. B65G 5/00
290/2
2,942,411 A * 6/1960 Hutchings ............... F01K 3/006
126/643
(Continued)

FOREIGN PATENT DOCUMENTS

DE   10 2010 010 701    9/2011
EP   0 191 516          8/1986
(Continued)

*Primary Examiner* — Mark Laurenzi
*Assistant Examiner* — Xiaoting Hu
(74) *Attorney, Agent, or Firm* — Whitham, Curtis & Cook, P.C.

(57) ABSTRACT

The invention relates to a pumped storage power plant (1) comprising at least one lower storage space (11) that is arranged underground and at least one upper storage space (12) that is separate from the lower storage space and arranged above ground or underground, wherein the lower storage space (11) is arranged in a greater depth than the upper storage space (12), and comprising at least one liquid line (15, 16) that is/are guided within the upper storage space (12) and within the lower storage space (11) respectively and that is/are connected to at least one hydraulic force and/or work machine (26, 27) of the pumped storage plant or can be connected via switchable valves (28, 29), and comprising at least one pressurized gas line (17, 18) that is/are guided within the upper storage space (12) and within the lower storage space (11) respectively and that is/are connected to a pressurized gas force and/or work machine (21, 22) of the pumped storage power plant or can be connected via switchable valves (24, 25), wherein the pumped storage power (Continued)

plant is configured for transporting a liquid medium (5, 7) from the upper storage space (12) into the lower storage space (11) and vice versa through the liquid lines (15, 16) and the hydraulic force and/or work machine (26, 27), and the pressurized gas force and/or working machine (21, 22) is configured for optionally producing a pressurized gas pressure of a pressurized gas (4, 6) at least in the lower storage space (11), which gas pressure can differ from a gas pressure in the upper storage space (12). Furthermore, the invention relates to a power plant and to methods for energy storage.

4 Claims, 2 Drawing Sheets

(30) Foreign Application Priority Data

| Feb. 16, 2012 | (DE) | 10 2012 003 123 |
| Mar. 16, 2012 | (DE) | 10 2012 005 336 |
| Mar. 20, 2012 | (DE) | 10 2012 005 571 |
| Mar. 28, 2012 | (DE) | 10 2012 006 376 |

(51) Int. Cl.
  *F03D 9/17*  (2016.01)
  *H02K 7/18*  (2006.01)
  *H02P 9/04*  (2006.01)

(52) U.S. Cl.
  CPC ............... *H02P 9/04* (2013.01); *Y02E 10/22* (2013.01); *Y02E 60/15* (2013.01); *Y02E 60/17* (2013.01)

(58) Field of Classification Search
  USPC .......................................... 60/659
  See application file for complete search history.

(56) References Cited

U.S. PATENT DOCUMENTS

| 3,538,340 | A | * | 11/1970 | Lang | E21B 43/28 166/305.1 |
| 3,939,356 | A | * | 2/1976 | Loane | F02C 6/16 290/52 |
| 4,182,128 | A | * | 1/1980 | Gardner | F03B 13/06 60/398 |
| 4,353,214 | A | * | 10/1982 | Gardner | F01K 3/00 60/39.52 |
| 5,461,858 | A | * | 10/1995 | Johnson | F01K 27/005 60/325 |
| 7,281,371 | B1 | * | 10/2007 | Heidenreich | F03B 13/00 60/398 |
| 7,952,219 | B2 | * | 5/2011 | Riley | F03B 13/06 290/43 |
| 2004/0059692 | A1 | * | 3/2004 | Hill | B65G 5/00 705/412 |
| 2009/0200805 | A1 | * | 8/2009 | Kim | F02C 6/16 290/52 |
| 2011/0247323 | A1 | * | 10/2011 | Kenway | B60L 11/16 60/415 |

FOREIGN PATENT DOCUMENTS

| EP | 0 212 692 | 12/1989 |
| WO | WO 93/06367 | 4/1993 |

* cited by examiner

UNITS AND METHODS FOR ENERGY STORAGE

BACKGROUND OF THE INVENTION

Field of the Invention

The invention relates to a pumped storage power plant for energy storage for energy generated from renewable sources, and to methods for energy storage using a pumped storage power plant.

Background Description

The invention relates in general to the field of energy storage for energy generated from renewable sources such as, for example, wind power or solar power. Since these types of energy generation are subject to irregularities, depending on weather, the need to store energy is becoming ever more important. Besides electrochemical storage, which is relatively demanding of resources, there are already proposals to implement a storage as mechanical energy, e.g. in so-called pumped storage hydropower plants or compressed air energy storage plants. Hitherto, pumped storage hydropower plants have been constrained locally by the geological conditions above ground, and new projects have encountered social acceptance problems because of their visual impact in the natural environment. Compressed air energy storage plants are socially acceptable, owing to the fact that it is possible for the chambers to be installed underground, but hitherto they have had relatively low efficiencies, and therefore a low energy efficiency. Pumped storage hydropower plants have therefore hitherto been realized only in landscapes with appropriate height differences. In landscapes such as the North German lowland, or on the open sea, where a large part of the wind energy is generated, the use of conventional pumped storage hydropower plants proves to be unrealistic.

There are already proposals, such as, for example, in EP 0 212 692 B1, to implement an energy storage in two underground storage spaces disposed at different depths. However, implementation of such proposals is thwarted by the problems of installing and operating appropriate pumping machines at great depth below the ground surface, in order to pump the liquid used from a lower storage space into the upper storage space. It is technically not feasible for liquid to be extracted by suction from a relatively deep lower storage space (e.g. at a depth of several 100 or 1000 m) by a pumping machine disposed above ground.

SUMMARY OF THE INVENTION

The invention is therefore based on the object of specifying means and methods for energy storage that allow large amounts of energy to be stored efficiently, with a reduced resource requirement, and therefore less expensively.

This object is achieved with the means and methods according to the independent claims. Advantageously, in particular, already existing underground chambers, e.g. caverns in salt domes, or other already existing chambers, e.g. underground chambers created by mining, may be used as an upper and lower storage space, or as a first and second storage space. To some extent, above-ground storage spaces or existing energy supply networks, e.g. natural gas networks, may also be used. The invention allows existing above-ground and underground chambers and existing line networks to be utilized in a variety of ways.

The invention is suitable, in particular, for a short-term, medium-term and/or long-term energy storage.

The invention makes it possible, in particular, to meet a local energy storage requirement that takes into account and implements the technical, economic and ecological requirements, as well as the social requirements. The invention can be implemented in practice with currently available technical components and equipment units. Existing artificial caverns, e.g. those used in the past for the storage of natural gas, petroleum or other substances, e.g. caverns in natural salt domes, may be used for the storage spaces. These caverns can be easily created in the numerous salt domes, e.g. those that exist in North Germany, by brining out with fresh water, or it is possible to use existing caverns that are no longer in use.

The invention, in one embodiment, relates to a pumped storage power plant, comprising at least one lower storage space that is disposed underground and at least one upper storage space that is separate from the latter and disposed above ground or underground, wherein the lower storage space is disposed at a greater depth than the upper storage space, and comprising at least one liquid line that is/are routed in the upper storage space and in the lower storage space respectively and that is/are connected to at least one hydraulic power engine and/or work machine of the pumped storage power plant or can be connected via switchable valves, including, if appropriate, necessary ancillary equipment, and comprising at least one pressurized gas line that is/are routed in the upper storage space and in the lower storage space respectively and that is/are connected to a pressurized gas power engine and/or work machine of the pumped storage power plant or can be connected via switchable valves, wherein the pumped storage power plant is set up to transport a liquid medium from the upper storage space into the lower storage space and vice versa through the liquid lines and the hydraulic power engine and/or work machine, and the pressurized gas power engine and/or work machine is/are set up to optionally generate a gas pressure of a pressurized gas, at least in the lower storage space, which gas pressure can differ from a gas pressure in the upper storage space.

The term depth has the meaning of the term as used in mining. The depth denotes how deep a point underground is located below a defined reference point on the surface (vertical distance between the two points), e.g. relative to the ground surface.

Advantageously, the pressurized gas power engine and/or work machine can be used to generate a gas pressure of the pressurized gas, at least in the lower storage space, that can differ from a gas pressure in the upper storage space, e.g. that can be entirely non-dependent on the gas pressure in the upper storage space. The upper storage space is thus decoupled from the lower storage space in respect of the gas pressure, e.g. owing to the fact that there is no direct connection between the pressurized gas lines. This opens up the possibility of using the gas pressure to assist the transport of the liquid medium from the lower storage space into the upper storage space, by an appropriate increase in gas pressure, either in such a manner that the liquid medium is conveyed into the upper storage space solely by the increased gas pressure of the lower storage space or, if appropriate, is conveyed from the lower storage space into the upper storage space by additional assistance by means of a liquid pump. This, in turn, has the advantage that there is no need for a liquid pump or other equipment units in the region of the lower storage space, which may be at a great depth below the ground surface. Rather, the gas pressure in the lower storage space can be increased by equipment units disposed on the ground surface, such as, for example, a compression machine. This simplifies the setting up and installation of the entire plant, as well as the servicing and maintenance of the plant. In particular, there is no need to perform servicing and maintenance of machines at great depth below the ground surface.

Advantageously, it is therefore possible for the hydraulic power engine and/or work machine to be disposed above ground. The pressurized gas power engine and/or work machine can also be disposed above ground. Clearly, it is also possible for the said machines to be disposed entirely or partially under the ground surface, e.g. at a lesser depth, for instance in the cellar of a building, or even at a somewhat greater depth.

Insofar as plant parts are installed above ground, this means that these plant parts are located on the ground surface or are disposed close to above and/or close to beneath the ground surface, either totally or partially.

The difference in the depth level of the two storage spaces makes it possible to implement an energy storage in the form of a storage of potential energy. When energy is to be stored, the liquid medium is transported from the lower storage space into the upper storage space. For this purpose, the gas pressure in the lower storage space is increased by means of the pressurized gas power engine and/or work machine. The pressurized gas power engine and/or work machine in this case is operated with electrical energy from an energy supply network and/or directly from electricity suppliers. When energy is to be extracted, the liquid medium is transported from the upper storage space into the lower storage space, and in this case is routed through the hydraulic power engine and/or work machine, which converts the potential energy of the liquid medium into electrical energy, e.g. by means of a turbine with a connected generator, and delivers it to an energy supply network and/or directly to electricity consumers.

The energy supply network may be a public and/or non-public energy supply network.

Insofar as reference is made to an upper and a lower storage space, or to a first and a second storage space, this also includes the possibility of further storage spaces, such as a third, fourth and other storage spaces. The further storage spaces may be disposed at the same depth level as the upper and the lower storage space, or at a different depth level.

The pressurized gas power engine and/or work machine may be realized, in particular, to optionally generate a different magnitude of gas pressure of the pressurized gas in the upper and the lower storage space respectively, such that any gas pressure can be set optionally in the respective storage space. This has the advantage that, in addition to the energy storage by means of the liquid medium, the entire plant may also additionally be used as a compressed gas store, e.g. for a short-term or long-term energy storage.

The pumped storage power plant may have a control means, e.g. in the form of an electronic control means, which controls the functions of the individual components of the pumped storage power plant, e.g. the pressurized gas power engine and/or work machine, and any switchable valves that might be present. The control means in this case may be set up to execute particular functions, as specified in the method claims. For this purpose, the control means may be realized, for example, as a programmable control means and execute a corresponding control program, the said functions or method steps being programmed into the latter. Accordingly, the invention also relates to a correspondingly realized control means comprising a control program, and to a control program that is set up to execute the method steps when the control program is executed on the control means. The control program may be stored on a data carrier.

According to an advantageous development of the invention, the control means is set up to increase the gas pressure in the lower storage space by controlling the pressurized gas power engine and/or work machine when the liquid medium is to be transported from the lower storage space into the upper storage space. This is necessary, for example, when energy is to be stored in the pumped storage power plant. In this case, the transport of the liquid medium into the upper storage space can be assisted by the increase in gas pressure in the lower storage space, or can even be performed entirely without an additional pump.

In the case of a delivery of energy from the pumped storage power plant, the liquid medium has to be transported from the upper storage space into the lower storage space, this being effected by gravity. Since, for the purpose of delivering energy, the liquid medium in this case is to be routed by the said hydraulic power engine and/or work machine to an energy supply network and/or direct electricity consumers, it is advantageous to connect the upper storage space to the lower storage space, via the hydraulic power engine and/or work machine, by means of the liquid lines, without leakages and without entrapped gas, if the hydraulic power engine and/or work machine is disposed above the upper storage space.

According to an advantageous development of the invention, the liquid line and/or the pressurized gas line is/are routed from above or from the side into the upper or the lower storage space. This has the advantage that the corresponding line can easily be taken into the storage space, e.g. through a drilled hole from the ground surface, which may run vertically or obliquely. In particular, in this way it is possible to avoid lines being routed to a storage space from below, as described in EP 0 212 692 B1, this having the advantage that it is possible to avoid routing of a line from a storage space from below, which in practice is extremely demanding of resources. This also makes it possible to prevent solids from entering the power engines and pumps via the connecting line.

According to an advantageous development of the invention, the pressurized gas power engine and/or work machine has/have at least one compression machine, for generating compressed pressurized gas, and an expansion machine, for delivering energy to a public and/or non-public energy supply network and/or directly to electricity consumers, by expansion of pressurized gas out of the upper or the lower storage space. The compression machine may be realized, for example, as an electrically driven compressor. The expansion machine may be realized, for example, as a compressed gas turbine having an electric generator connected thereto. This has the advantage that, not only can the pressurized gas power engine and/or work machine be used to generate the compressed pressurized gas but, upon its expansion, energy can also be recovered again from the pressurized gas and delivered to the energy supply network and/or directly to electricity consumers. The total energy efficiency of the pumped storage power plant is increased further as a result. In addition, the suitability of the pumped storage power plant for short-term and medium-term energy storage is improved.

According to an advantageous development of the invention, the control means is set up, by controlling the hydraulic power engine and/or work machine, upon the expansion of compressed pressurized gas in the expansion machine, to transfer the liquid medium into that storage space from which the pressurized gas is taken, from the respectively other storage space. As a result of this, the cooling caused by expansion is reduced, and the latitude for operation of the cavern, i.e. the corresponding storage space is expanded (pressure reduction or temperature reduction per equipment unit of time). In particular, the pressure in the storage space can be maintained, and no cooling occurs in the storage space during the expansion process. Then, upon expansion, only the heat required in the expansion machine has to be supplied to the process.

According to an advantageous development of the invention, the control means is set up, by controlling the hydraulic power engine and/or work machine, upon the expansion of compressed pressurized gas in the expansion machine, to pass such a quantity of liquid medium into that storage space from which the pressurized gas is taken that the gas pressure in this storage space remains substantially the same, or at least is not significantly reduced. It is thereby possible to realize an advantageous, substantially isobaric operation of the storage space. The control means in this case has corresponding sensors, or is connected to corresponding sensors in order to perform this function.

According to an advantageous development of the invention, the control means is set up, by controlling the hydraulic power engine and/or work machine, upon the expansion of compressed pressurized gas in the expansion machine, to pass such a quantity of liquid medium into that storage space from which the pressurized gas is taken that the temperature of the pressurized gas in this storage space is increased. The control means in this case has corresponding sensors, or is connected to corresponding sensors in order to perform this function.

According to an advantageous development of the invention, there is a heat circuit, which has at least one heat exchanger through which the pressurized gas flows, and at least one heat exchanger through which the liquid medium flows, wherein the heat exchangers can be connected under control in such a manner that heat produced upon the compression of the pressurized gas is transferred into the liquid medium and/or upon the expansion of the pressurized gas heat is transferred from the liquid medium into the pressurized gas. This makes it possible, in particular, for the temperature changes produces by compression and expansion of the pressurized gas to be used as energy, or to be stored temporarily, by means of the liquid medium, and delivered back to the pressurized gas at another point in time.

According to an advantageous development of the invention, the control means is set up, during the expansion of the pressurized gas out of the lower storage space, to preheat the pressurized gas by controlling the heat circuit, by means of the heat exchangers, in a counterflow arrangement, with the liquid medium taken from the upper storage space. This has the advantage that a drop in temperature occurring during the expansion of the pressurized gas can be fully or partially compensated, such that an efficient isothermal expansion can be realized.

According to an advantageous development of the invention, the control means is set up to limit, to a predefined limit value, the variation over time of the gas pressure of the pressurized gas. This has the advantage that the storage spaces filled with pressurized gas are not subjected to excessive stress when there a change in gas pressure, and specified load limits are observed.

According to an advantageous development of the invention, the control means is set up to receive and process energy storage requests and, if a short-term energy storage is requested via an energy storage request, to increase the gas pressure of the pressurized gas in the upper and/or in the lower storage space, and in the case of an energy storage request that requests an energy storage duration that is longer than the short-term energy storage, to transport liquid medium from the lower storage space into the upper storage space. This has the advantage that the a particularly suitable energy storage method can be used, according to a foreseeable energy storage duration, namely, in the case of the short-term energy storage, the storage in the form of an increased gas pressure, and the storage of energy by means of the potential energy of the liquid medium in the case of a longer energy storage duration. This enables the energy efficiency of the pumped storage power plant to be increased further. The energy storage requests may be supplied to the control means, e.g. from a power plant control station or from other power plants or energy supply network operators, e.g. via a data communication network.

According to an advantageous development of the invention, the liquid medium is brine, a liquid mixture containing brine, or another liquid mixture. The pressurized gas is compressed air or another gas or another gas mixture. In particular, the brine may be a saturated brine. This has the advantage that a medium that is in any case present in underground caverns, in particular in salt domes, can be used as a liquid medium.

According to an advantageous development of the invention, one or more immersion pumps, for conveying the liquid medium, is/are disposed in the upper and/or in the lower storage space. This has the advantage that the pumps can be easily installed, since they can be lowered from the ground surface into the storage space through, for example, the liquid line or a shaft provided for this purpose. Since the pump is designed as an immersion pump, it is ready for use as soon as it is in the liquid medium. There is therefore no need for a special installation of the pump, in particular installation in a separate machine room close to the storage space.

According to an advantageous development of the invention, there is a mechanical and/or chemical separation layer between the liquid medium and the pressurized gas. The mechanical separation layer may be realized, for example, in the manner of a membrane, for example of an elastic or non-elastic material.

In a further embodiment, the invention relates to a power plant, in particular a pumped storage power plant as claimed in any one of the preceding claims, or compressed air energy storage plant, comprising at least one first and, separate therefrom, one second storage space at the same depth level or at a different depth level, and comprising at least one pressurized gas line that is/are routed in the first storage space and in the second storage space respectively and that is/are connected to a pressurized gas power engine and/or work machine of the power plant or can be connected via switchable valves, wherein the pressurized gas power engine and/or work machine is set up to optionally generate a gas pressure of a pressurized gas of differing magnitudes in the first and the second storage space respectively, and comprising a control means, which is set up, upon the expansion of pressurized gas out of one storage space, to transfer the expanded pressurized gas into the other storage space.

This has the advantage that that there is a closed system, constituted by the first and the second storage space, for the storage of pressurized gas, such that the pressurized gas does not have to be released into the atmosphere, as in the case of known compressed air energy storage plants. Rather, the pressurized gas can be conveyed back and forth, from the one storage space into the other. This has the advantage that gases other than air can also be used as a pressurized gas, e.g. natural gas. A further advantage is that this creates a closed pressurized gas system in which both storage spaces or all available storage spaces, are always kept under a certain pressure. In particular, the power plant may also be realized without the components of the pumped storage, i.e. the liquid circuit. Insofar as the power plant realized as a pumped storage power plant, described previously, the lower storage space can serve, for example, as a first storage space, and the upper storage space can serve as a second storage space, or vice versa. Separate storage spaces may also be provided for the pressurized gas circuit and for the liquid circuit.

According to an advantageous development of the invention, the control means is set up, upon the expansion of pressurized gas out of a storage space, not to allow the gas pressure in this storage space to fall below a predefined minimum pressure value, for example not below 60 to 100 bar. This has the advantage that the energy efficiency of the pressurized gas storage can be increased considerably as compared with conventional compressed air energy storage plants. This is based substantially on the physical effect whereby, for the compression of one mol of a gas from, for example, 1 bar to 10 bar, just as much heat is produced as in the case of an increase in pressure from 10 bar to 100 bar, wherein, by contrast, the compression energy p·V contained in the gas is correspondingly proportionally higher in the case of a higher pressure level. Since, with the power plant according to the invention, the gas pressure storage and expansion can also be performed at overall relatively high pressure levels, a relatively high compression energy can be realized while, at the same time, only small temperature differences occur, such that, in the case of such a mode of operation, the caverns, lines and power engines are subjected to a lesser thermal and mechanical load.

According to an advantageous development of the invention, the control means is set up to generate a higher pressure in the first storage space than in the second storage space and, upon an expansion of pressurized gas, to take the pressurized gas out of the storage space that has the higher pressure, route it through an expansion machine, and transfer the expanded pressurized gas into the other storage space.

BRIEF DESCRIPTION OF THE DRAWINGS

The invention is explained in greater detail in the following, on the basis of exemplary embodiments and with reference to drawings.

In the drawings

DETAILED DESCRIPTION THE INVENTION

In the figures, elements that correspond to each other are denoted by the same references.

Figure 1:
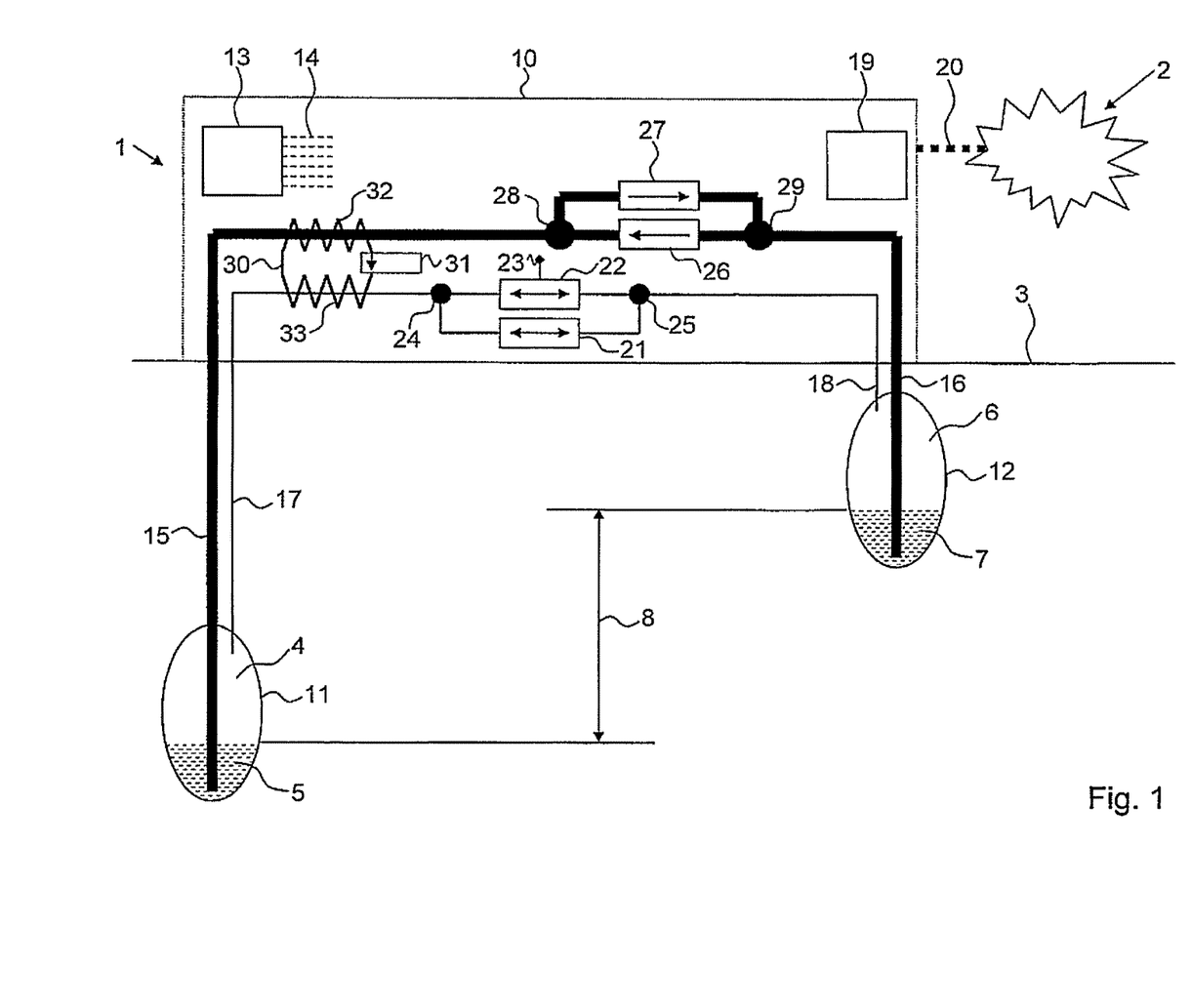
FIG. 1 shows a pumped storage power plant in a schematic representation.

FIG. 1 shows a pumped storage power plant 1, which is connected via electric lines 20 to a public or non-public electrical energy supply network 2 that may also include direct electricity suppliers or electricity consumers. The pumped storage power plant 1 is set up to store excess energy for a short, medium or long term in the energy supply network 2, and to deliver electrical energy back to the energy supply network 2 when there is an additional energy demand in the energy supply network 2.

For this purpose, the pumped storage power plant 1 has a lower storage space 11 disposed underground, i.e. at a substantial depth beneath the ground surface 3, and an upper storage space 12, which likewise may be disposed underground or above ground or in the region of the ground surface 3. The pumped storage power plant 1 is set up to use the potential energy of a liquid medium 5, 7, present in a liquid circuit, for energy storage. The lower storage space 11 is therefore disposed at a greater depth, i.e. a greater depth beneath the ground surface 3, than the upper storage space 12. As represented in FIG. 1, in the lower storage space 11 there is a liquid medium 5, and in the upper storage space 12 there is a liquid medium 7, wherein the liquid media 5, 7 are normally the same media, which are transported back and forth between the storage spaces 11, 12 when energy is to be stored or extracted. Between the liquid levels of the liquids 5, 7 there is a height difference 8 which, together with the mass of the liquid medium 7 present in the upper storage space 12, results in the potential energy stored at any given time.

In the lower storage space 11, there is a pressurized gas 4 above the liquid medium 5. In the upper storage space 12, there is a pressurized gas 6, above the liquid medium 7, which is normally the same gas as the pressurized gas 4. Routed in the lower storage space there is a liquid line 15, which is connected to equipment units disposed above ground, to be explained at a later point. In addition, routed in the lower storage space 11 there is a pressurized gas line 17, which is likewise connected to equipment units on the ground surface. As can be seen, the liquid line 5 is routed into the lower storage space 11 approximately as far as the lower region of the latter. The pressurized gas line 17 terminates in the upper region of the lower storage space 11. In the same way, routed in the upper storage space 12 there are a liquid line 16 and a pressurized gas line 18, which are likewise connected to equipment units disposed above ground. Again, the liquid line 16 is routed approximately as far as the lower region of the lower storage space 12, and the pressurized gas line 18 terminates in the upper region of the upper storage space 12.

The pumped storage power plant 1 has a series of equipment units, which, by way of example in FIG. 1, are disposed above ground, i.e. above the ground surface 3, which can be combined in a power plant block 10. The power plant block 10 may be realized, for example, as a power plant building. Clearly, individual equipment units, or all equipment units, may also be disposed beneath the ground surface 3, close to the surface, or even at a greater depth. For reasons of practical realization of the pumped storage power plant, however, it is advantageous for the equipment units to be disposed above ground.

In the power plant block 10 there is a control means 13, which may be realized, for example, as a control computer or master computer of the pumped storage power plant 1, e.g. in the form of a computer. Via electric lines 14, which are represented symbolically, the control means 13 is connected to the individual equipment units, for the purpose of controlling the latter or receiving measurement data from them. The control means 13 is additionally connected, via the lines 14, to an energy request interface, via which energy storage requests and energy delivery requests can be received from outside, e.g. from power plant operators or energy suppliers. The control means 13 processes these requests and controls the equipment units according to the request in such a manner that electrical energy from the energy supply network 2 is either stored in the pumped storage power plant 1 or is delivered from the latter, back to the energy supply network 2.

The pumped storage power plant 1 has, in particular, the following equipment units. The liquid line 15 is connected to a hydraulic power engine and/or work machine 26, 27 via a controllable valve arrangement 28. The liquid line 16 is connected to the hydraulic power engine and/or work machine 26, 27 via a controllable valve arrangement 29. The hydraulic power engine and/or work machine 26, 27 may have, for example, a liquid turbine (e.g. water turbine) 26, comprising a generator for generating electrical energy that is delivered to the energy supply network 2, as well as an electrically driven pump 27, which can assist transport of the liquid medium from the lower storage space 11 into the upper storage space 12 by means of a pumping function. Depending on the direction of transport of the liquid medium, as indicated by the arrows in the liquid turbine 26 and the pump 27, the controllable valves 28, 29, including any necessary ancillary equipment 19, are switched correspondingly by the control means 19, in order either to transport the liquid medium from the upper storage space 12 into the lower storage space 11, when energy is to be delivered to the energy supply network 2, or to transport liquid medium from the lower storage space into the upper storage space 12, when energy from the energy supply network 2 is to be stored in the pumped storage power plant 1.

The components 11, 12, 15, 16, 26, 27, 28, 29 thus constitute a liquid circuit.

The pressurized gas line 17 is connected to a pressurized gas power engine and/or work machine 21, 22 via a controllable valve arrangement 24. The pressurized gas line 18 is connected to the pressurized gas power engine and/or work machine 21, 22 via a controllable valve arrangement 25. The pressurized gas power engine and/or work machine 21, 22 may comprise, for example, an expansion machine 21, e.g. in the form of a gas turbine having a generator, and a compression machine 22, e.g. in the form of an electrically driven compressor. The compression machine 22 is marked with a two-sided arrow since, depending on control of the controllable valve arrangements 24, 25 by the control means 13, it is able to convey pressurized gas from the upper storage space 12 into the lower storage space 11 and thereby increase the gas pressure in the lower storage space 11, and conversely, in corresponding manner, to convey pressurized gas from the lower storage space 11 into the upper storage space 12 and thereby increase the gas pressure in the upper storage space 12. In this case, the gas pressure in the lower storage space 11 and in the upper storage space 12 may be defined separately in each case, wherein the compression machine 22 is activated whenever pressurized gas is to be transported from a storage space that has a lower gas pressure into a storage space that has a higher gas pressure. The compression machine 22 may be connected, for example, to a connection 23, via which any additional pressurized gas from the atmosphere or from a gas network connected to the connection 23 can be fed into the pressurized gas circuit.

If pressurized gas is to be transported from a storage space that has a higher gas pressure into a storage space that has a lower gas pressure, the expansion machine 21 is activated by control of the controllable valve arrangements 24, 25. By means of the expanding pressurized gas flowing through the expansion machine 21, the expansion machine 21 can generate electrical energy and deliver it to the energy supply network 2. The expansion machine 21 may likewise be connected, or connectable, to the connection 23, in order to release any excessive quantities of gas present in the pressurized gas system.

The components 11, 12, 17, 18, 21, 22, 23, 24, 25 thus constitute a pressurized gas circuit.

The pressurized gas circuit of the pumped storage power plant 1 may be used, on the one hand, to cause the liquid medium 5 to be pumped up from the lower storage space 11 into the upper storage space 12 as the result of a positive gas pressure, or at least to assist the functioning of the pump 27 (hydro operating mode of the power plant). In addition, the pressurized gas circuit may be used to temporarily store energy from the energy supply network 2, in the form of increased gas pressure, in the pumped storage power plant 1, and to deliver it back to the energy supply network 2 when required, by expansion in the expansion machine 21. In this way, a combined pumped storage and compressed gas storage power plant can be realized (turbo operating mode of the power plant).

In addition to the liquid circuit and the pressurized gas circuit, a third circuit is provided in the pumped storage power plant 1, this being a heat circuit 33.

The heat circuit 33 connects the liquid lines 15, 16 thermally to the pressurized gas lines 17, 18. As can be seen in FIG. 1, the heat circuit 33 may be constituted, for example, by a heat exchanger 32, through which the liquid medium flows, and by a heat exchanger 33, through which the pressurized gas flows, wherein the heat exchangers 32, 33 are connected to each other. A heat exchanger medium, usually a liquid medium, can be pumped through the heat exchangers 32, 33 by a heat circuit pump 31 that can be controlled by the control means 13, in order to effect the exchange of heat between the liquid circuit and the pressurized gas circuit. The control means 13 can switch the heat circuit pump 31 on and off when required.

The heat circuit 30 may be realized in a manner other than that represented in FIG. 1, thus, for example, in that the respective liquid line 15, 16 is disposed within the respective pressurized gas line 17, 18, such that the pressurized gas is transported in the remaining annular space.

Figure 2:
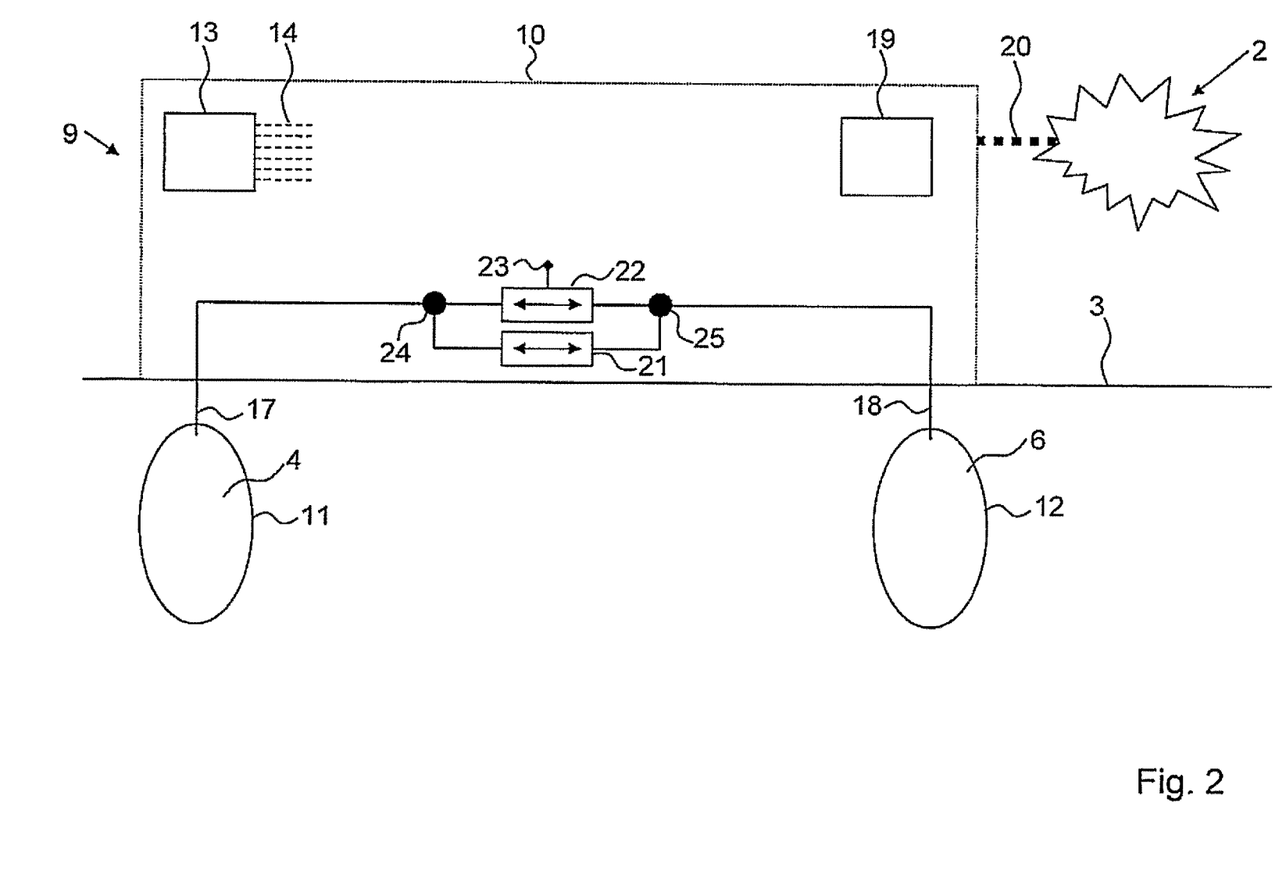
FIG. 2 shows a power plane in a schematic representation.

FIG. 2 shows a power plant 9 having only the pressurized gas circuit described previously, i.e. no liquid circuit. The power plant is then operated in a so-called aero mode. The components represented in FIG. 2, whose references are the same as those from FIG. 1, correspond to the components already described with reference to FIG. 1. Unlike the pumped storage power plant according to FIG. 1, in the case of the power plant 9 according to FIG. 2 the storage spaces 11, 12 may be disposed at any depth levels underground or, if appropriate, also above ground, such that other existing formations may also be used to construct the power plant 9. In contrast with known compressed air energy storage plants, the power plant 9 comprises the basically closed pressurized gas circuit with the two storage spaces 11, 12, between which the pressurized gas 4, 6 can, as it were, move back and forth. Owing to the closed system, a certain minimum pressure of the pressurized gas 4, 6 can always be maintained in the storage spaces 11, 12, such that an energy storage operation can be realized with a considerably higher energy efficiency than in the case of known compressed air energy storage plants, in which there is only one storage space, and the stored air is always compressed from the atmospheric level and expanded back to the atmospheric level.

The following gives further examples for the operation of the pumped storage power plant 1 or of the power plant 9. The aforementioned storage spaces 11, 12 are also referred to as caverns.

It is not easily possible to pump liquids back and forth between two chambers at different depth levels. Usually, for this purpose, the pump is installed beneath the lowest basin. The reason for this is that a pump requires an admission pressure, so that the liquid can flow into the pump by gravity. Pumps can only build up pressure and pump a liquid up. For physical reasons, the suction of liquids by means of a pump is only possible up to heights of approximately 8-10 m. With greater height differences, the flow would separate off and the pump would run idle.

Described above and in the following is a method for storing potential energy in an underground pumped storage power plant. As already explained, the upper and lower basins required for the pumped storage may be realized as underground chambers. The deficiency, that the liquid cannot easily be effected between the two basins by pumps disposed above ground, this being desirable, however, both technically and economically, is compensated in the case of the method described here in that the two caverns are connected to a further line, and a gas pressure is applied to the caverns. This gas pressure in the caverns may be of such a magnitude that, for the liquid in the other lines, a pressure is obtained at the pump that is sufficient to enable the liquid to be circulated by pumping. This pressure should be higher than the air pressure prevailing at the surface; more precise values are given in the following description of an example.

Bringing a compressed gas into the system likewise requires a considerable expenditure of energy, which likewise can be used for energy storage. In the invention described here, this stored energy can likewise be converted into work, at a turbine operated with gas (expansion turbine). The gas pressure required in the system is generated by a compressor.

If the gas present in the system is to be compressed and expanded, this can likewise be effected from one cavern into the other. For this purpose, one of the caverns is brought to a higher pressure, preferably the lower cavern. This can be effected by a provided compressor or, alternatively, by pumping the liquid, wherein the caverns are separated from each other in an appropriate manner.

If the compression is effected by means of the compressor, heat is produced. This heat can be delivered, via a heat exchanger, to the liquid flowing in the counterflow, and can be stored in this liquid.

Upon expansion, the heat can be taken from the reversed liquid flow, supplied to the gas, and converted into work in the expansion turbine. A suitable technical means may be selected as a heat exchanger or, alternatively, the heat exchange may be effected in the bores, if both the gas and the liquid flow in only one bore, wherein the liquid flows in the ascending tube and the gas flows in the annular space. Such arrangements are used as standard in the storage of petroleum and natural gas. Gas and liquid flow in a counterflow arrangement in the bores.

A further advantage of the system described thus far also consists in that the gas is not completely expanded, but is stored in an already compressed state in a second cavern. If the gas is not compressed starting from atmospheric pressure, but starting from a higher pressure, then significantly more energy is stored in the volume work and not converted into heat, which is positive in respect of efficiency. This advantage is likewise explained in the following example.

The chambers, referred to as caverns in the following, are established at differing depths. The top of the upper cavern 12 is to be at a depth of 900 m, and the top of the lower cavern 11 is to be at a depth of 1650 m. The caverns 11, 12 are each to have a volume of 500000 m3. Two bores are made down into each of the caverns, wherein one may already exist from the process of creating the cavern by brining out. The bores in which the liquid is to be pumped have an effective diameter of 30 inch (762 mm), and the bores in which the compressed gas is to move back and forth is to be 20 inch (508 mm).

Such bores are produced as standard; for this reason, the US dimensions in inches, which are usual in the drilling industry, are also used. The liquid used in the system is to have a density of 1250 kg/m3. As a result of this, a pressure of approximately 202 bar, which is caused by the liquid column, is produced at the top of the lower cavern. In order to obtain a liquid column pressure of 4 bar at the ground surface, a gas pressure of approximately 206 bar must be applied in total to the lower cavern, measured at the top of the cavern. In the upper cavern, a pressure of approximately 187 bar is thus obtained (measured at the top of the cavern) if, for example, air is used as a gas. The maximum pressure that can be applied to the upper cavern is approximately 190 bar. This pressure is limited by properties of the rock that relate to rock mechanics, and may differ from the value stated here. This maximum pressure must be observed in any case. The maximum operating pressure of the lower cavern is likewise observed with this procedure.

Both caverns are connected to a line in which the liquid is circulated by pumping, and to a line in which the gas can move back and forth. Pressure can be applied to the lower cavern via this line. If the pressure in the system is kept over the hydrostatic pressure of the liquid by the compressed air, the liquid can be conveyed from the lower cavern into the upper cavern by means of a pump installed above ground. Furthermore, the liquid can be routed out of the upper cavern, via the turbine, to generate electricity.

The pressure losses in the lines, for the gas and for the liquid, are approximately 3 bar; the flow rate for the gas is approximately 8 m/s, and approximately 3.5 m/s for the liquid.

In the system, approximately 1200 MWh can be stored as potential energy in the liquid. At the stated flow rates, the output at the turbine 26 is approximately 10 MW, with a discharge duration of 84 h. This system is preferably suitable for long-term storage, over several days. An increase in output can be achieved by using bores of larger diameter or, alternatively, several bores may be made in parallel.

For storage of electricity, it is necessary to cover both long-term storage periods (several days) and short-term storage cycles (day/night) or, alternatively, short-term power peaks.

The system can also be used for short-term power provision. If, for example, the pressure in the lower cavern 11 is increased by 20 bar by pumping up with water, then an output of approximately 50 MW can be achieved for approximately 2 h by a subsequent expansion from the system, wherein the temperature change in the cavern is only approximately 10° C. This operation can be used for short-term power provision.

During the compression of a gas, heat is produced if the gas does not perform work; conversely, in the case of expansion, energy in the form of heat must be supplied in order that the gas can perform work and does not cool excessively in the process. In the previously proposed processes for the storage of energy, air from the atmosphere is compressed and stored in a chamber. This chamber is of large scale, e.g. a salt cavern, as described above. The pressures in such a cavern are than approximately 150 to 250 bar, depending on the depth.

If a gas is compressed from atmospheric pressure (~1 bar) to 150 bar, it undergoes a temperature increase of approximately 530 kelvin. If this compressed gas is stored in a volume of 1 m³, the heat produced in this process is approximately 25 kWh. By contrast, the energy (p·V) contained in the tension of the gas is only approximately 4.2 kWh. In the case of complete expansion, the same quantity of heat must be given back, as otherwise icing processes occur in the system. If the heat produced during compression cannot be stored and cannot be supplied back to the process during expansion, then the process has a very low efficiency, of approximately 14%, wherein the efficiency is obtained from the ratio of the mechanical work w and the energy expended overall (heat q plus work w) (4.2/(25+4.2)).

Owing to the large quantity of heat produced, the large scale compression of a gas from atmospheric pressure is performed in stages, wherein there must be intermediate cooling of the gas. This can be illustrated using the example of isothermal compression. The quantity of heat produced in the case of isothermal compression is calculated as:

$$q = nRT \cdot \ln(p_1/p_2)$$

wherein q is the quantity of heat, n is the quantity of gas in mol, R is the general gas constant, T is the temperature, $p_1$ is the input pressure, and $p_2$ is the output pressure.

This means that, for the compression of one mol of a gas from 1 bar to 10 bar, just as much heat is produced as for compression from 10 bar to 100 bar, wherein, by contrast, the compression energy p·V contained in the gas (p is the pressure, V is the volume) is lower in the first stage than in the second, and the temperature change is the same.

The result of these considerations is that, for the storage of energy, it is advantageous to start from a higher pressure level.

This can be achieved if the process is performed, for example, not between 1 bar and 150 bar, but for example between 130 bar and 150 bar. The gas produced during the expansion process must then be stored in a further chamber that would be available for further compression. In this process, the quantity of heat produced, relative to 1 m³ of chamber volume, would be 0.7 kWh and the compression energy would be approximately 0.6 kWh. The efficiency in this case would be 46%.

The caverns described above may be used for this type of energy storage, wherein the liquid and the equipment and lines needed for the liquid can be omitted. Likewise, it is not necessary for the caverns to be installed at differing depths, although this may be advantageous, in order better to meet the requirements in terms of rock mechanics. In the case of the system described here, the lower cavern 11 is to be brought to a pressure of 280 bar, the pressure at the surface then being approximately 230 bar. The pressure in the cavern is to be decompressed by 20 bar, in that gas is taken out of the cavern at a high rate. The temperature change in the cavern is approximately 7° C. This gas is supplied to the expansion turbine 21, where it is expanded with a pressure difference of 70 bar. In this case, the gas undergoes a further reduction in temperature, of approximately 35° C. Work is performed in this process, the output being approximately 30 MW for a flow rate of 2 million standard cubic meters per hour.

The gas is then stored in the second cavern 12, at a pressure of between approximately 130 and 150 bar, if this cavern is the same size as the first.

From the second cavern 12, the gas can then be brought back to the high pressure in the first cavern, wherein changes in pressure and temperature occur in the reverse direction.

This process has the advantage that changes in pressure and temperature that are permitted according to the currently applicable guidelines for underground natural gas storage occur in the caverns. The cooling and preheating of the gas can be omitted, and both the above-ground equipment units and the bores and caverns are not subjected to excessive changes in temperature and pressure.

LIST OF REFERENCES

1 pumped storage power plant
2 energy supply network and/or direct electricity suppliers and consumers
3 ground surface
4 pressurized gas
5 liquid medium
6 pressurized gas
7 liquid medium
8 height difference
9 power plant
10 power plant block
11 lower, or first, storage space
12 upper, or second, storage space
13 control means
14 electric lines
15 liquid line
16 liquid line
17 pressurized gas line
18 pressurized gas line
19 ancillary equipment
20 electric lines
21 expansion machine
22 compression machine
23 pressurized gas connection
24 controllable valve arrangement
25 controllable valve arrangement
26 liquid turbine
27 pump
28 controllable valve arrangement
29 controllable valve arrangement
30 heat circuit
31 heat medium pump
32 heat exchanger
33 heat exchanger

The invention claimed is:
1. A compressed-air energy storage plant, comprising
at least one first and, separate therefrom, one second storage space at the same depth level or at differing depth levels,
at least one pressurized gas line that is/are routed in the first storage space and in the second storage space respectively
a compression machine of the compressed-air energy storage plant connected to the at least one pressurized gas line optionally via switchable valves, wherein the compression machine is set up to optionally generate a gas pressure of a pressurized gas of differing magnitudes in the first and the second storage space respectively,
a control means, which is set up, upon an expansion of pressurized gas out of one of the first and second storage spaces, to transfer the expanded pressurized gas into the other of the first and second storage spaces, and a pressurized gas expansion machine, which is operated for supplying energy to an energy supply network solely through expansion of the pressurized gas by transferring the pressurized gas out of one of the first and second storage spaces into the other of the first and second storage spaces, wherein the control means is set up, upon the expansion of pressurized gas out of one of the first and second storage spaces, not to allow the gas pressure in each of the first and second storage spaces to fall below a predefined minimum pressure value of 60 bar in order to realize a high compression energy with a small temperature difference.

2. The compressed-air energy storage plant as claimed in claim 1, wherein the control means is set up to generate a higher pressure in the first storage space than in the second storage space and, upon the expansion of pressurized gas, to take the pressurized gas out of the storage space that has the higher pressure, route it through the expansion machine, and transfer the expanded pressurized gas into the other storage space.

3. A method for energy storage by means of a compressed-air energy storage plant, comprising the steps of:

providing at least one first and, separate therefrom, one second storage space at the same depth level or at differing depth levels, routing at least one pressurized gas line that is in the first storage space and in the second storage space, respectively, connecting a compression machine to the at least one pressurized gas line via switchable valves, wherein the compression machine is set up to optionally generate a gas pressure of a pressurized gas of differing magnitudes in the first and the second storage space, respectively, controlling the transfer of expanded pressurized gas into the other of the first and second storage spaces upon an expansion of pressurized gas out of one of the first and second storage spaces, and operating a pressurized gas expansion machine for supplying energy to an energy supply network solely through expansion of the pressurized gas by transferring the pressurized gas out of one of the first and second storage spaces into the other of the first and second storage spaces, wherein, upon the expansion of pressurized gas out of one of the first and second storage spaces, the gas pressure in each of the first and second storage spaces does not fall below a predefined minimum pressure value of 60 bar in order to realize a high compression energy with a small temperature difference.

4. The method as claimed in claim 3, wherein a higher pressure is generated in the first storage space than in the second storage space and, upon the expansion of pressurized gas, the pressurized gas is taken from the storage space that has the higher pressure, routed through the expansion machine, and the expanded pressurized gas is transferred into the other storage space, wherein energy is delivered by the expansion machine to a public and/or non-public energy supply network and/or directly to electricity consumers.

* * * * *